US007286544B2

(12) United States Patent
Forbes et al.

(10) Patent No.: US 7,286,544 B2
(45) Date of Patent: Oct. 23, 2007

(54) VIRTUALIZED MULTIPORT SWITCH

(75) Inventors: Brian Forbes, Foster City, CA (US);
Lino Costantino, Oakland, CA (US);
Howard Green, Carlsbad, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1139 days.

(21) Appl. No.: 10/205,214

(22) Filed: Jul. 25, 2002

(65) Prior Publication Data

US 2004/0017808 A1    Jan. 29, 2004

(51) Int. Cl.
*H04L 12/28*    (2006.01)
(52) U.S. Cl. ...................................... 370/400; 370/386
(58) Field of Classification Search ................ None
See application file for complete search history.

(56) References Cited

U.S. PATENT DOCUMENTS

| | | | | | |
|---|---|---|---|---|---|
| 5,825,772 | A | * | 10/1998 | Dobbins et al. | ............ 370/396 |
| 5,920,699 | A | * | 7/1999 | Bare | .......................... 709/225 |
| 5,999,531 | A | * | 12/1999 | Ferolito et al. | ............. 370/390 |
| 6,226,295 | B1 | * | 5/2001 | Morzano | ............... 370/395.31 |
| 6,260,073 | B1 | * | 7/2001 | Walker et al. | ............... 709/249 |
| 6,826,195 | B1 | * | 11/2004 | Nikolich et al. | ............ 370/465 |
| 6,963,565 | B1 | * | 11/2005 | Krishna et al. | ............. 370/392 |
| 7,093,024 | B2 | * | 8/2006 | Craddock et al. | ........... 709/238 |
| 2001/0030785 | A1 | * | 10/2001 | Pangrac et al. | ............. 359/125 |
| 2002/0034187 | A1 | * | 3/2002 | Kalkunte et al. | ........... 370/401 |
| 2003/0099242 | A1 | * | 5/2003 | Shah et al. | ............... 370/395.4 |

OTHER PUBLICATIONS

Mellanox Technologies, [online] http://www.mellanox.com/products/provr2.html.
Mellanox Technologies, "InfiniBridge MT21108 Infiniband Channel Adapter and Eight Port Switch".
Intel® InfiniBand Architecture, "Solutions for Developers and IT Managers", 2002.
Infiniband™ Trade Association, Infiniband™ Architecture Release 1.0a, Jun. 19, 2001, vol. 1, pp. 40-45, 61-128, 676-679, and 845-861.

* cited by examiner

*Primary Examiner*—Phirin Sam
(74) *Attorney, Agent, or Firm*—Conley Rose, P.C.

(57) ABSTRACT

A multiport switch assembly comprises a plurality of discrete switch devices coupled together in a way that virtualizes the behavior of a multiport switch assembly. Each of said switch devices preferably has fewer ports than the number of ports made externally available by the multiport switch assembly. The multiport switch assembly preferably comprises a plurality of tiers of switch devices and a processor connected directly or indirectly to all or at least some of the switch devices. The processor executes code that permits the multiport switch assembly to appear, from the viewpoint of external logic (e.g., management entities, end nodes, routers, etc.), to operate as a single switch device. This alleviates the burden on the external logic, which otherwise would have to control each individual switch device to accomplish the desired switching behavior of the switch assembly.

22 Claims, 3 Drawing Sheets

VIRTUALIZED MULTIPORT SWITCH

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer networks. More particularly, the invention relates to electronic switches through which communications pass from one point in a network to another. Still more particularly, the invention relates a plurality of switching devices that are combined together in such a way as to virtualize a larger, multiport switch.

2. Background Information

Initially, computers were most typically used in a standalone manner. It is now commonplace for computers and other types of computer-related and electronic devices to communicate with each other over a network. The ability for computers to communicate with one another has lead to the creation of networks ranging from small networks comprising two or three computers to vast networks comprising hundreds or even thousands of computers. Networks can be set up to provide a wide assortment of capabilities. For example, networks of computers may permit each computer to share a centralized mass storage device or printer. Further, networks enable electronic mail and numerous other types of services. Generally, a network's infrastructure generally comprises switches, routers, hubs and the like to coordinate the effective and efficient transfer of data and commands from one point on the network to another.

Internetworking of high-performance computers has become the focus of much attention in the data communications industry. Performance improvements in processors and peripherals, along with the move to distributed architectures such as client/server configurations, have spawned increasingly data-intensive and high-speed networking applications, such as medical imaging, multimedia, and scientific visualization. Various protocols have been developed to provide the necessary communications capacity.

One such protocol is InfiniBand™. InfiniBand™ permits high data rates of 2.5 gigabits per second ("Gbps") in each direction. An exemplary InfiniBand™ architecture is shown in FIG. 1. The InfiniBand™ architecture is designed around a point-to-point, switched input/output ("I/O") fabric, that interconnects a plurality of end node devices 10 via connection "fabric" 12 comprising a plurality of switches 14. The end nodes 10 can range from I/O devices such as disk arrays and tape drives to complex host computers.

The InfiniBand™ switched fabric 12 provides a reliable transport mechanism in which messages are enqueued for delivery between end nodes. The InfiniBand™ protocol defines standard media and signaling conventions for transporting data in a serial fashion, provides error detection codes and a packet structure for transporting the data, and creates some standard services (e.g., subnet manager, subnet administrator). Details regarding the InfiniBand™ protocol can be found online at www.infinibandta.org.

The InfiniBand™ architecture can be scaled to provide for a relatively small or large numbers of nodes. As such, the switches 14 may be required to provide anywhere from a relatively few ports to a large number of ports. Semiconductor devices ("chips") are available that provide a switching function. For example, Mellanox Technologies currently offers an 8-port switch called the InfiniBridge MT21108. Messages entering any one of the eight ports can be directed to any one of the other seven ports. A subnet manager 18 is also provided to configure the switches 14.

In the event a system architect designs an InfiniBand fabric using 8-port switches 14, for obvious reasons, an 8-port switch such as the MT21108 device is well suited for use in such a network. However, it may be desired for the switches 14 in the network to have more than eight ports. For example, 16-port switches 14 may be desired. Despite the desire, in this example, for 16-port switches, the switch devices available on the market may have less than 16 ports, such as the 8-port MT21108 switch device. Further, it is generally very expensive to develop and test a new switch device. Moreover, multiport switches 14 may be desired having more ports than currently available semiconductor switch devices provide. It may be cost and time prohibitive to develop new switch devices having the desired number of ports to match the continuously changing needs of network architects. A solution to this problem is needed.

BRIEF SUMMARY OF THE PREFERRED EMBODIMENTS OF THE INVENTION

The preferred embodiments of the present invention solve the problems noted above by providing a multiport switch assembly that comprises a plurality of discrete switch devices coupled together in a way that virtualizes the multiport switch assembly. Each of said switch devices preferably has fewer ports than the number of ports made externally available by the multiport switch assembly. The multiport switch assembly preferably comprises a plurality of tiers of switch devices and a processor connected directly or indirectly to all or at least some of the switch devices. The processor executes code that permits the multiport switch assembly to appear, from the viewpoint of external logic (e.g., management entities, end nodes, routers, etc.), to operate as a single switch device. This alleviates the burden on the external logic, which otherwise would have to control each individual switch device to accomplish the desired switching behavior of the switch assembly.

In accordance with one preferred embodiment of the invention, the switch assembly is usable in a network and provides n external ports for coupling to external logic via network communication links. The switch assembly preferably comprises a plurality of switch devices coupled together, each of the switch devices having a number of ports that is less than n. The switch assembly also has a processor that is coupled to said switch devices to configure the switch devices to virtualize the n-port switch assembly so that the external logic can interact with the n-port switch assembly as a single logical entity. The switch devices preferably are configured into two groups with a first group providing the externally available ports to the external logic and a second group providing ports for connection to the switch devices in the first group. The processor may couple to all of the switch devices in both groups directly via a side-band bus (e.g., PCI bus). Alternatively, the processor may couple directly only to the switch devices of the second group and indirectly to the first group's switch devices via the second group switch devices.

As noted above, although the switch assembly comprises a plurality of discrete, separately programmable switch devices, the switch assembly is virtualized meaning that it appears to be a single logical entity from the vantage point of external logic. One operational feature that is preferably virtualized is the coordination of forwarding tables in the switch assembly. The switch assembly receives a single forwarding table from external logic and the switch assembly's processor generates a plurality of separate switch device tables based on this forwarding table. The switch device tables are transferred to each of the associated switch devices in the assembly. Each of the switch device tables provides information which informs the switch device how to transfer packets from input to output ports on that particular switch device. Thus, the processor takes on the burden of virtualizing the switch assembly. Other operational features can be virtualized as well.

These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer and computer-related companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections.

The terms "switch" and "switch assembly" refer to a network component that performs a switching functioning to transfer data packets from one place on the network to another. The term "switch device" is intended to refer to a semiconductor device that comprises the network switch. As explained below, a switch comprises a plurality of switch devices coupled together in a way so as to make the resulting switch appear to be one device to external logic which may include hardware, software, firmware and applications. The term "virtualization" refers to the actions that are performed to make the collection of switch devices appear to be a single switch device to external logic. To the extent that any term is not specially defined in this specification, the intent is that the term is to be given its plain and ordinary meaning.

DETAILED DESCRIPTION OF THE PREFERRED EMBODIMENTS

Figure 1:
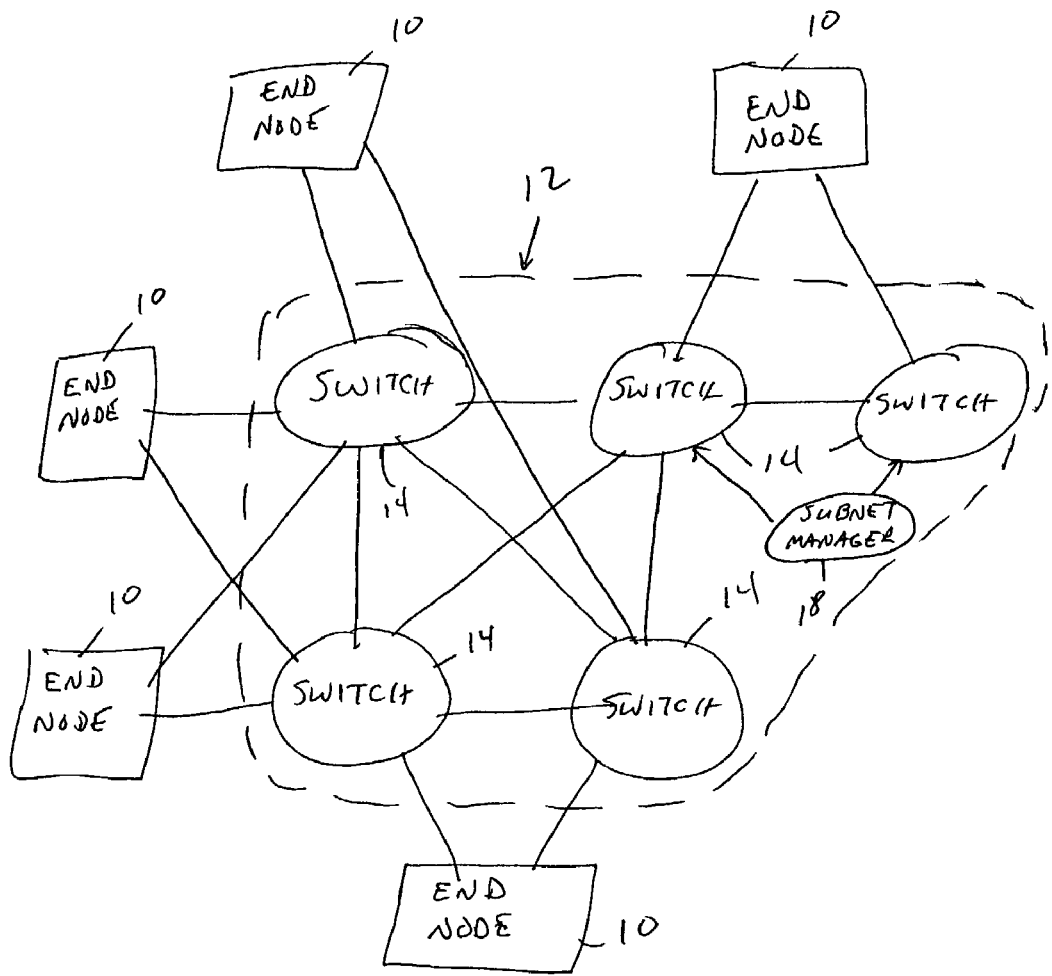
FIG. 1 shows an exemplary system configuration of an InfiniBand™-based network comprising one or more multiport switches.
Figure 2:
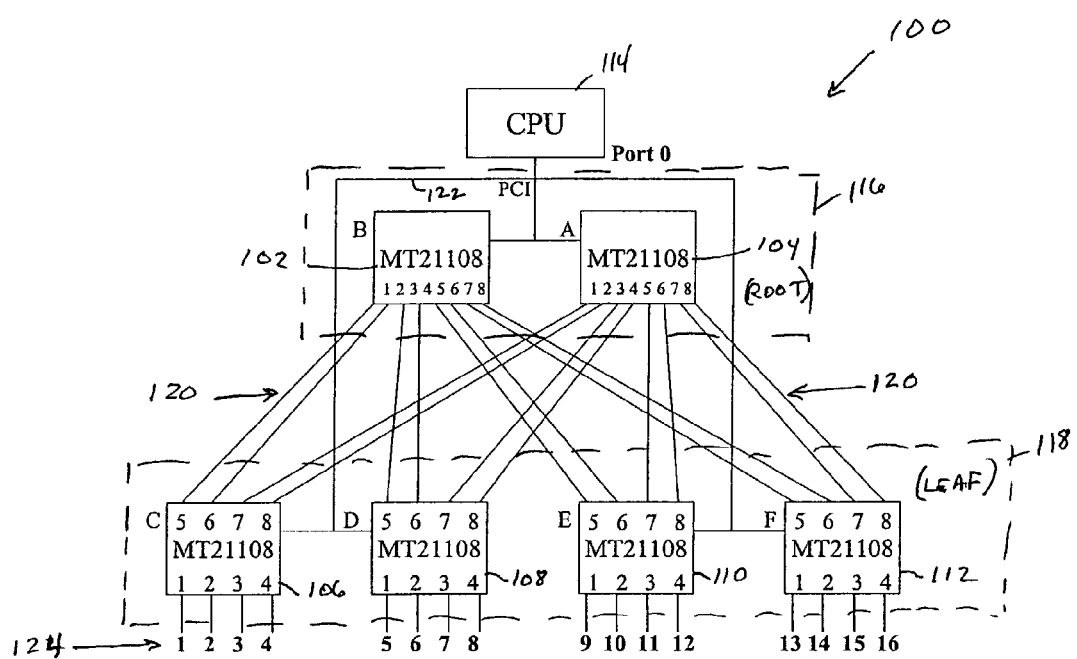
FIG. 2 shows a preferred embodiment of a multiport switch assembly comprising a plurality of smaller switch devices configured to virtualize a larger switch.

Referring now to FIG. 2, a multiport switch assembly 100 is shown configured in accordance with a preferred embodiment of the invention. The switch assembly 100 preferably comprises multiple tiers, each tier having at least one switch device. As shown in the exemplary embodiment of FIG. 1, the switch assembly 100 comprises two tiers 116 and 118. Tier 116 is referred to as the "root" tier and tier 118 is referred to as the "leaf" tier. Each tier comprises one or more switch devices. The root tier includes a pair of switch devices 102 and 104, while the leaf tier includes four switch devices 106-112. The switch assembly 100 also includes a central processing unit ("CPU") 114 coupled via a suitable bus connection 122 to all of the switch devices in each of the tiers.

The switch devices 102-112 comprising the tiers 116 and 118 of the switch assembly 100 preferably, but not necessarily, are the same. As shown in the exemplary embodiment of FIG. 2, the switch devices comprise 8-port switch devices, such as the MT21108 switches provided by Mellanox Technologies. Each switch device 102-112 includes eight I/O ports configured as shown in FIG. 2. Ports 1-4 of each of the leaf tier switches 106-112 preferably are used as the I/O ports to couple to logic external to the switch assembly 100 such as end nodes, other switches and management entities as shown in FIG. 1. These externally available ports are denoted by the reference numeral 124. In the example of FIG. 2, switch assembly 100 preferably comprises a 16-port switch assembly and, accordingly, ports 1-4 on the four switch devices 106-112 provide the 16 externally available ports 124 comprising the 16-port switch assembly 100.

Each switch device 102-112 preferably contains embedded executable code that enables the device to perform its preferred functions. For design simplicity, the embedded code preferably is the same in each switch device. Alternatively, each switch device can be provided with unique code if desired.

Each of the root switch devices 102 and 104 also includes eight ports that are used to couple to the leaf tier switches 106-112. As such, tiers 116 and 118 are interconnected by signal lines 120 between ports 1-8 in switch devices 102-104 and ports 5-8 of each of the switch devices 106-112. Thus, broadly, switch assembly 100 comprises a multiport switch comprising multiple tiers of multiport switch devices interconnected using some of their ports, while other of their ports are used for external port connections. The switch architecture shown in FIG. 2 illustrates an advantage of the preferred embodiment of the present invention in that existing "off the shelf" switch devices can be coupled together into a switch that provides the desired number of ports. In general, the switch assembly 100 comprises an n-port switch comprising a plurality of switch devices coupled together, each switch device having a number of ports less than n. The switch architecture is readily scalable meaning that additional switch devices can be added to increase the number of external ports provided by the switch assembly. Further, other embodiments of the invention include a ring/loop of switch devices, instead of tiered arrangement as shown in FIG. 2.

Although the multiport switch assembly 100 is constructed from a plurality of "smaller" switch devices (smaller in the sense that each switch device 102-112 has a fewer number of ports than the larger switch assembly 100), it also is preferable that switch assembly 100 appears to external logic as a single 16-port switch device. To that end, CPU 114 functions, at least in part, to "virtualize" a multi-port switch whereby external logic (e.g., subnet managers, end nodes, other switches, etc.) interacts with the switch assembly 100 as if it was a single logical entity (e.g., a single addressable entity). Under control of CPU 114, switches 102-112 coordinate their behavior in a manner which is transparent to the external logic. Moreover, external logic generally need not, and is not, aware that switch assembly 100 comprises a plurality of discrete, smaller switches. Virtualizing a larger switch alleviates the operational burden on external logic, which otherwise would have to control each individual switch device 102-112 to accomplish the desired switching behavior. Virtualizing also reduces the amount of cabling that would otherwise be required.

The InfiniBand™ architecture, as well as the architecture of various other standards now known or later developed, specifies that switches are configured with "forwarding" tables. In general, InfiniBand™-compliant switches 100 preferably are transparent to the end nodes and are not directly addressed, except by subnet management operations. To this end, every destination port within the network is configured with one or more unique local identifiers ("LIDs"). From the point of view of a switch assembly 100, a LID represents a path from an input port through the switch to an output port. Switch assemblies 100 are configured by subnet managers with forwarding tables which specify an output switch port 124 to which an incoming message on another port 124 is to be directed. Packets are addressed to their ultimate destination on the subnet using a destination LID ("DLID"), not to intervening switch assemblies 100. Individual packets are forwarded within a switch to an outbound port or ports based on the packet's DLID field and the switch's forwarding table.

As explained above, each switch assembly 100 in an InfiniBand™ network preferably is virtualized from the point of view of external logic to operate as a single multiport switch, not a collection of smaller switch devices connected together and individually configured and operated. To achieve this result, the switch's CPU 114 receives the forwarding table from the subnet manager or other external logic via one of the externally available ports 124. The table is provided to the CPU 114 via one of the leaf switch devices 106-112 and the bus 122. Although the bus 122 coupling the switch devices 102-112 may be any suitable bus, in accordance with the preferred embodiment, the bus 122 preferably comprises a peripheral component interconnect ("PCI") bus on a PCI-X, 3GIO or SPI bus, or other suitable bus. Accordingly, in addition to providing eight I/O ports, each switch device also includes a PCI bus interface to the CPU 114.

The CPU 114 receives the forwarding table generated by the subnet manager for the virtualized multiport switch assembly 100 and preferably generates individual forwarding tables for each of the switch devices 102-112 comprising the switch assembly 100. That is, the CPU 114 translates the externally-provided forwarding table to forwarding tables for each of the individual switch devices which permits the switch assembly 100 to implement the requirements of the externally-provided forwarding table. To avoid confusion with the externally-provided forwarding table, the tables that are internally created by the CPU are called "switch device tables" in this disclosure.

Each switch device table specifies an output port on the associated switch device to which a packet should be directed from a particular input port of the switch device based on a packet's LID and the forwarding table of the switch assembly 100. For example, referring to the external port numbers, the forwarding table of switch assembly 100 may specify that all messages received on external I/O port number 15 with a particular LID should be directed out through port number 6. The CPU 114 preferably uses this information to program the switch device tables of switches 104 and 112 to cause such messages to be routed from input port 15 of switch device 112, through port number 7 (or 8) of switch device 112, to input port 7 (or 8) of switch device 104, out port 3 (or 4) of switch device 104 to input port 7 (or 8) of switch device 108 and, finally, out port 2 of switch device 108 which is defined as the switch assembly 100's external port number 6. Needless to say, the creation of the switch device tables from the single forwarding table depends largely on the contents of the forwarding table. Further, the specific construction of the switch device specific tables would be well within the ability of a person of ordinary skill in the art.

Each switch device table in switch devices 102-112 preferably is configured independently of the other switch device tables. That is, the CPU 114 has full control over the switching behavior of each switch device. Once the CPU generates the individual switch device tables based on the forwarding table provided by the subnet manager, the CPU transfers the switch device tables into each switch device via the PCI bus 122.

In addition to virtualizing forwarding tables, switch assembly 100 may also virtualize one or more other management functions, and preferably virtualizes all management functions associated with a network switch. Such other virtualized functions may include providing status information and performance monitoring.

As an additional optimization, each leaf switch device 106-112 preferably handles and responds to all system management packets for which the switch device has all of the information necessary to respond to the packet. Such locally-processed system management packets are not forwarded up to the CPU 114, thereby reducing the operational burden on the switch assembly and improving switch performance. One exemplary type of system management packet that can be processed exclusively by a leaf switch device is a request by a management entity for the switch assembly 100 to report the amount of activity through the switch's external ports 124. For example, the management entity may desire the amount of traffic through port number 9 (on leaf switch device 110). In accordance with the preferred embodiment of the invention, traffic quantity per port is maintained locally in each switch device 102-112 and thus the switch's CPU 114 need not be involved to respond to this request. Instead, switch device 110 in this example preferably responds to the management packet by providing the requested information.

Figure 3:
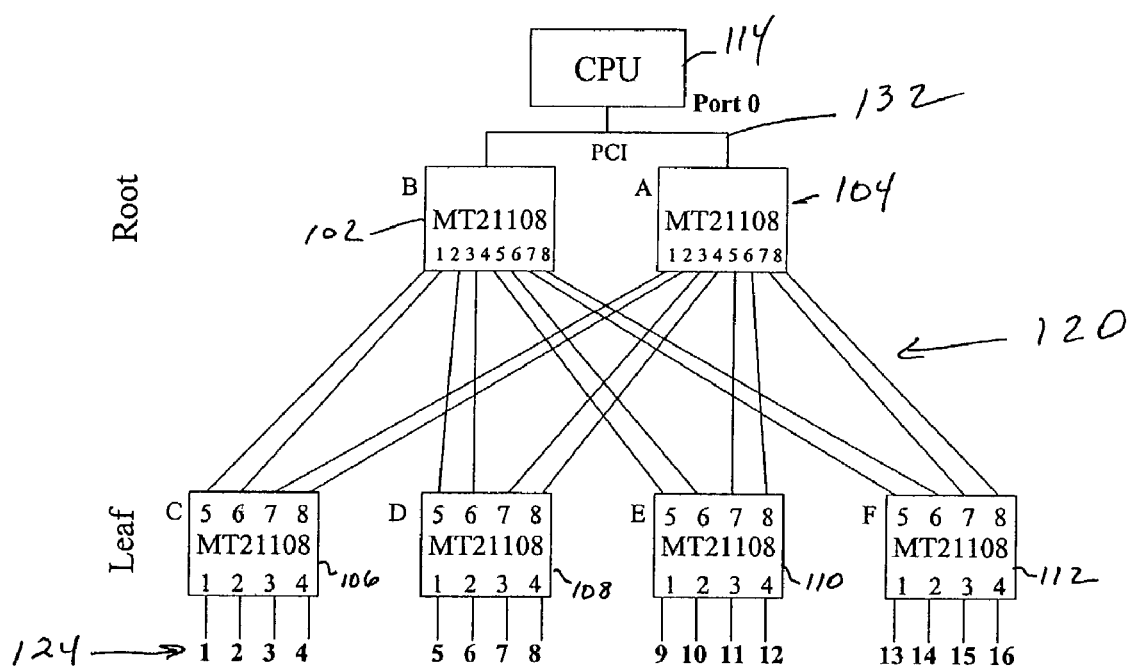
FIG. 3 shows an alternative embodiment of a multiport switch assembly also comprising a plurality of smaller switch devices configured to virtualize a larger switch.

An alternative embodiment of a virtualized multiport switch assembly is show in FIG. 3. The embodiment shown in FIG. 3 is largely the same as the embodiment of FIG. 2 with one exception. In FIG. 2, PCI bus 122 couples all of the switch devices 102-112 to the CPU 114. In FIG. 3, however, a PCI bus 132 only couples the root switch devices 102-104 to the CPU 114 and, if desired, only one of the root switch devices to the CPU. Forwarding table packets received from an external system management entity will still be received by one of the leaf switch devices 106-112 and forwarded up to the CPU. Instead of being provided directly to the CPU via a PCI or other "out-of-band" mechanism, the forwarding table packet must be provided to a root switch device 102, 104 via in-band connectivity 120 and then provided from the root switch device to the CPU via the out-of-band PCI bus 132.

Referring still to FIG. 3, CPU-generated switch device tables for the leaf switches 106-112 will have to forwarded by the CPU 114 over PCI bus 132 to a root switch device and then from a root switch device over signal lines 120 to the leaf switch devices. Packets transmitted between the root and leaf switch devices across the interconnecting signal lines 120 preferably are formed in accordance with the network standard (e.g., InfiniBand™) in which the switch assembly 100 is used. The CPU-generated switch device tables thus are provided from the root switch devices to the leaf switch devices in a format compliant with the network standard. This means that the leaf switch devices 106-112 receive both externally-generated forwarding table packets and internally-generated switch device table packets in accordance with, for example, the InfiniBand™ standard. As such, the leaf switch devices should be configured to determine whether an incoming packet containing packet routing information was received from an external management entity or a root switch device. This determination can be made by examining the packet's source LID (i.e., the LID of the sender). If the packet originated from outside the switch assembly 100, and received via an external port 124, that packet is simply forwarded on to a root switch device via in-band communication link 120 for subsequent forwarding up to the CPU 114 via PCI bus 132. On the other hand, if the routine-related packet originated internally and thus was received from a root switch device on a port 5-8 on a leaf switch device, the leaf switch device preferably acts on the packet and sets or changes its internal switch device table in accordance with the contents of the packet, and does not forward that packet on to other entities in the switch assembly 100 or the network in general.

The preferred embodiments discussed above provide a multiport switch comprising a plurality of interconnected smaller switch devices. The architecture of the switch may include at least two tiers of switch devices, and, if desired, more than two tiers. Alternatively, the switch devices can be configured in a ring topology. Further, the architecture can readily be scaled to create a switch having any desire number of ports. Although the multiport switch comprises a plurality of discrete and separately programmable switch devices, from the viewpoint of external logic, the switch appears to be a single switch device.

The above discussion is meant to be illustrative of the principles and various embodiments of the present invention. Numerous variations and modifications will become apparent to those skilled in the art once the above disclosure is fully appreciated. In general, the claims which follow are not limited to InfiniBand and apply to other types of switched interconnects including, without limitation, fibre channel. It is intended that the following claims be interpreted to embrace all such variations and modifications.

What is claimed is:

1. An electronic switch assembly usable in a network and providing n external ports for coupling to external logic via network communication links, comprising:
   a plurality of switch devices coupled together, each of said switch devices having a number of ports less than n; and
   a processor coupled to said switch devices and configuring said switch devices to virtualize said n-port switch assembly so that the external logic can interact with said n-port switch assembly as a single switch.

2. The switch assembly of claim 1 wherein said switch devices are configured to form a plurality of groups of switch devices in which only one of said groups provides said n external ports to said external logic.

3. The switch assembly of claim 1 wherein said switch devices are configured to form two groups of switch devices, a first group providing said n external ports to said external logic and a second group providing ports for connection to the switch devices of said first group.

4. The switch assembly of claim 3 wherein said processor couples to the switch devices of said first and second groups via a bus protocol that differs from said communication links.

5. The switch assembly of claim 4 wherein said bus protocol comprises a peripheral component interconnect bus protocol.

6. The switch assembly of claim 3 wherein said processor connects to each of said switch devices in said second group via a bus having a protocol that differs from said communication links, and does not connect directly to any of the switch devices in said first group.

7. The switch assembly of claim 3 wherein the switch devices of said first group respond to at least some externally provided management packets without forwarding said management packets to said processor.

8. The switch assembly of claim 1 wherein said processor receives a forwarding table from external logic which specifies which of the n external ports a message should be directed to when received on another of said n external ports, and said processor generates separate switch device tables for each of said switch devices based on said forwarding table.

9. The switch assembly of claim 8 wherein said processor transmits each of said switch device tables to said switch devices for storage therein.

10. The switch assembly of claim 9 wherein said switch device tables are transmitted to said switch devices over a bus connected between said processor and each of said switch devices, said bus having a protocol that differs from the communication links.

11. A computer network, comprising:
    a plurality of end nodes;
    a management entity; and
    a plurality of multiport switch assemblies coupled to said end nodes and said management entity via a plurality of communication links and configured by said management entity, each of said multiport switch assemblies having externally available ports for connection to external logic, at least one of said multiport switch assemblies comprising:
    a plurality of switch devices coupled together, each of said switch devices having a number of ports less than the number of externally available ports; and
    a processor coupled to said switch devices and configuring said switch devices to virtualize said multiport switch assembly so that the management entity can interact with said multiport switch assembly as a single switch.

12. The computer network of claim 11 wherein said switch devices within said at least one switch assembly are configured to form a plurality of groups of switch devices in which only one of said groups provides said externally available ports to said external logic.

13. The computer network of claim 11 wherein said switch devices within said at least one switch assembly are configured to form two groups of switch devices, a first group providing said externally available ports to said external logic and a second group providing ports for connection to the switch devices of said first group.

14. The computer network of claim 13 wherein said processor couples to the switch devices of said first and second groups via a bus protocol that differs from said communication links.

15. The computer network of claim 14 wherein said bus protocol comprises a peripheral component interconnect bus protocol.

16. The computer network of claim 13 wherein said processor connects to each of said switch devices in said second group via a bus having a protocol that differs from said communication links, and does not connect directly to any of the switch devices in said first group.

17. The computer network of claim 13 wherein the switch devices of said first group respond to at least some externally provided management packets without forwarding said management packets to said processor.

18. The computer network of claim 11 wherein said processor receives a forwarding table from said management entity which specifies which of the externally available ports a message should be directed to when received on another of said externally available pods, and said processor generates separate switch device tables for each of said switch devices based on said forwarding table.

19. The computer network of claim 18 wherein said processor transmits each of said switch device tables to said switch devices for storage therein.

20. The computer network of claim 19 wherein said switch device tables are transmitted to said switch devices over a bus connected between said processor and each of said switch devices, said bus having a protocol that differs from the communication links.

21. A method of virtualizing a multiport switch assembly comprising a plurality of discrete switch devices coupled to a processor, comprising:

receiving a forwarding table from external logic;

generating a plurality of switch device specific tables specific to each of said switch devices based on said forwarding table, each of said switch device specific tables specifying how data packets are to be forwarded from one switch device to another; and transferring said switch device specific tables to each of said switch devices.

22. The method of claim 21 further including receiving a data packet having a location identifier and transmitting said packet between at least two of said switch devices based on said location identifier and said switch device specific tables.

* * * * *